G. P. CARROLL.
SAFETY CONSTRUCTION FOR REFRIGERANT AND OTHER FLUID CIRCULATING APPARATUS.
APPLICATION FILED OCT. 16, 1916.
1,273,577.
Patented July 23, 1918.
4 SHEETS—SHEET 1.
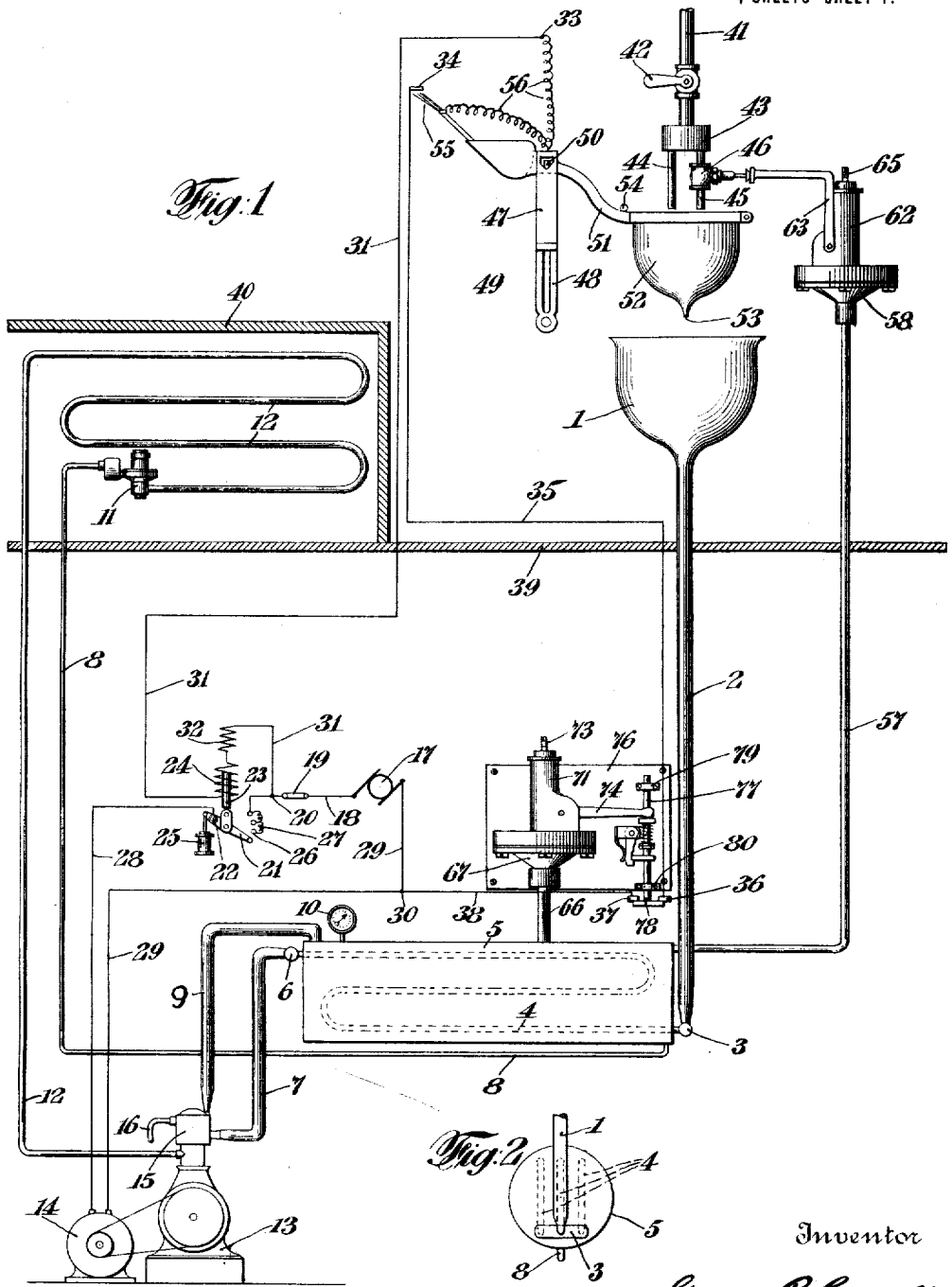
Inventor
George P. Carroll

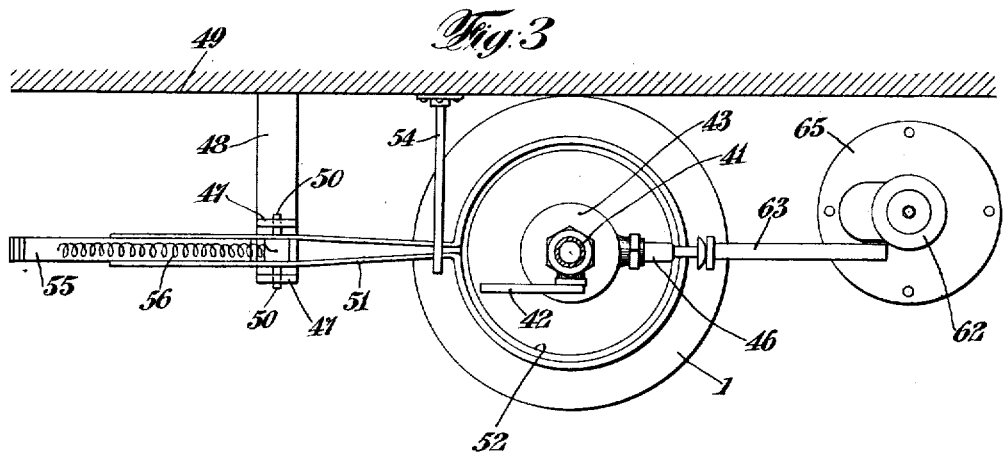
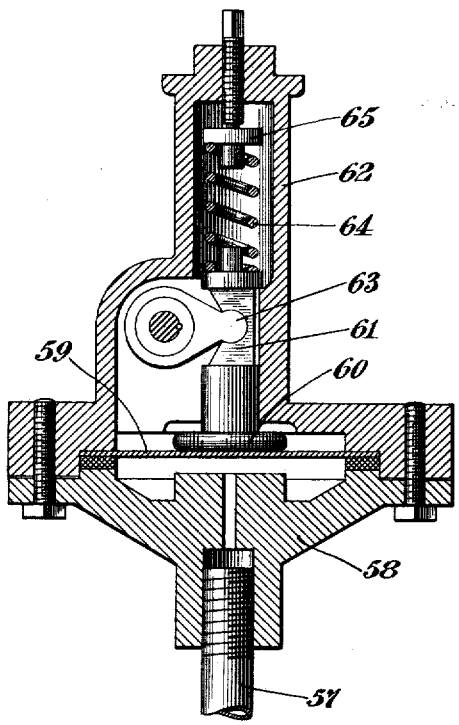
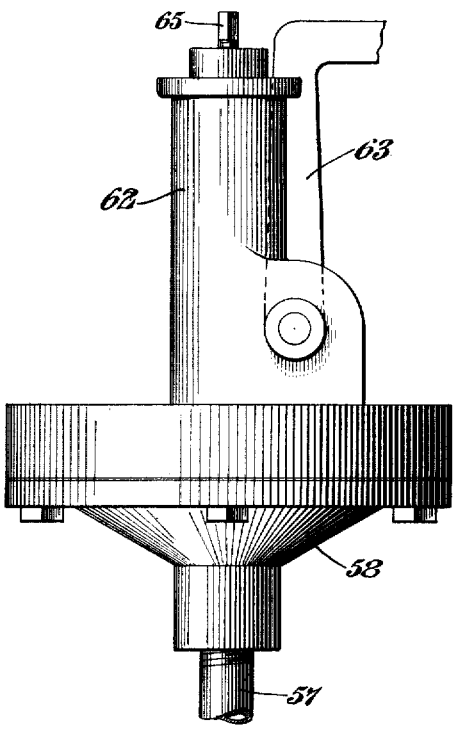

G. P. CARROLL.
SAFETY CONSTRUCTION FOR REFRIGERANT AND OTHER FLUID CIRCULATING APPARATUS.
APPLICATION FILED OCT. 16, 1916.
1,273,577. Patented July 23, 1918.
4 SHEETS—SHEET 3.
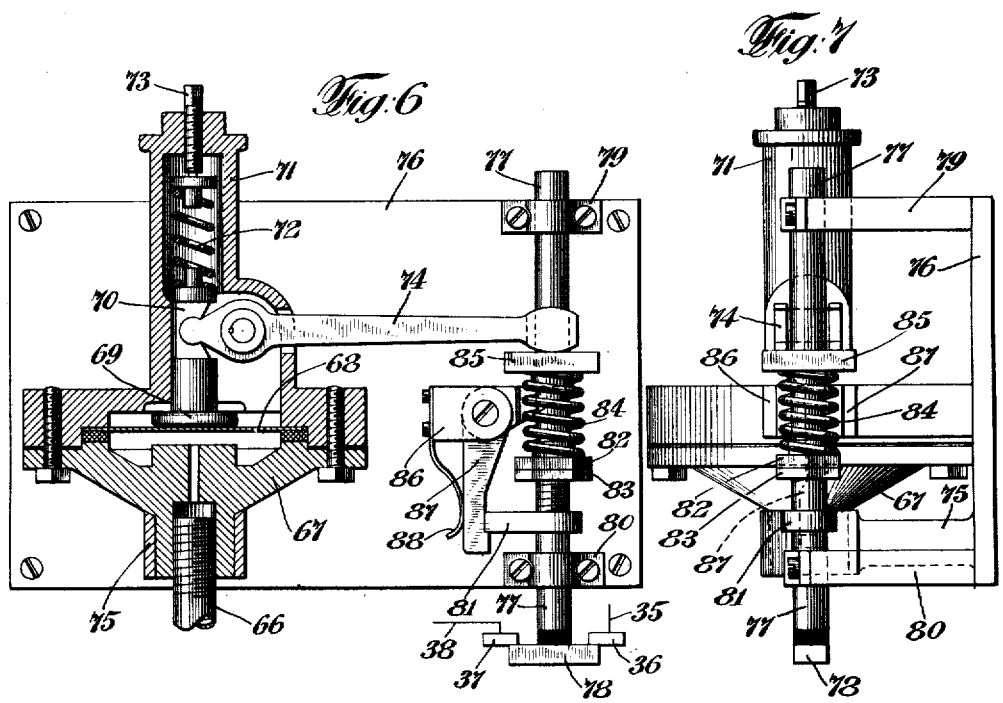
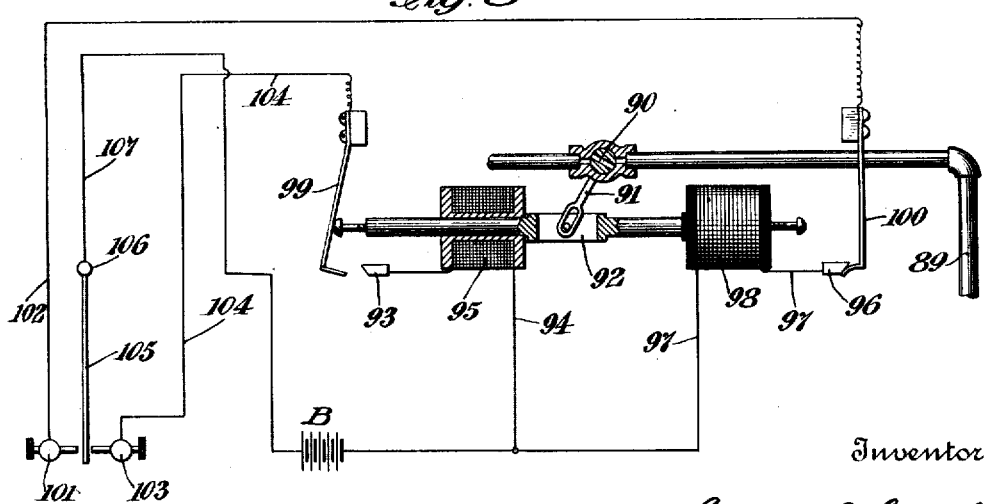
Inventor
George P. Carroll

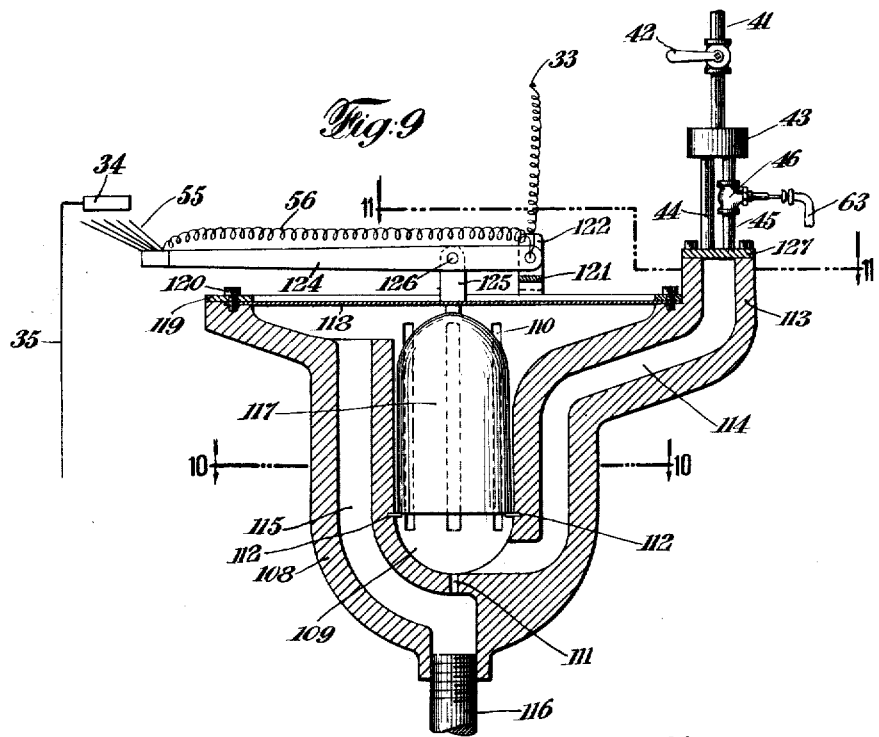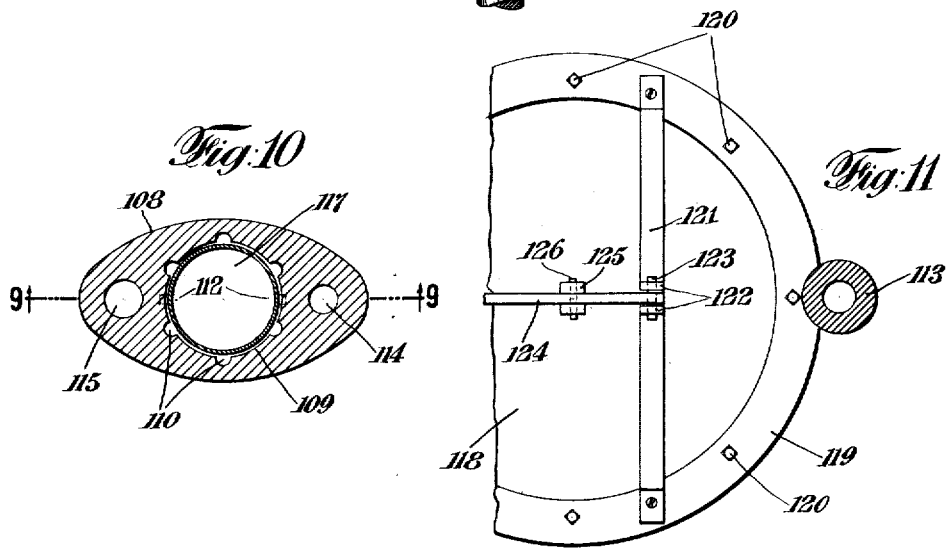

UNITED STATES PATENT OFFICE.

GEORGE P. CARROLL, OF HARTFORD, CONNECTICUT.

SAFETY CONSTRUCTION FOR REFRIGERANT AND OTHER FLUID CIRCULATING APPARATUS.

1,273,577.  Specification of Letters Patent.  Patented July 23, 1918.

Application filed October 16, 1916. Serial No. 126,019.

*To all whom it may concern:*

Be it known that I, GEORGE P. CARROLL, a citizen of the United States, residing at Hartford, in the county of Hartford and State of Connecticut, have invented a new and useful Safety Construction for Refrigerant and other Fluid Circulating Apparatus, of which the following is a specification.

My invention relates to improvements in the means for controlling the operation of any kind of apparatus that circulates a refrigerant or other fluid under conditions that may develop high and dangerous pressures in the system. The purposes of my invention are so to regulate such apparatus as to prevent excessive pressures in the system, to provide a graduated flow of cooling water for cooling the circulated fluid, to secure economy and efficiency of operation with the minimum of attention and to accomplish these results by simple and reliable means that can readily be incorporated in existing plants as well as included in those yet to be installed. The instrumentalities for accomplishing these purposes are as will be hereinafter set forth. There are certain detail improvements of construction that will also so appear. While the description will refer to ammonia as the fluid to be circulated, it is to be understood that this fluid and the pressure conditions considered in relation thereto are to be taken as typical of all.

In the drawings, Figure 1 is a diagrammatic representation of one form of my invention. Fig. 2 is a right end elevation of a condenser tank and certain adjacent parts. Fig. 3 is a plan view of the water actuated starting device shown in Fig. 1, in its upper part. Fig. 4 is a partial vertical section and a partial front elevation of the water controlling pressure device shown in Fig. 1, at the upper right hand. Fig. 5 is a rear elevation of the construction shown in the preceding figure. Fig. 6 is a partial front elevation and a partial vertical section of the emergency safety device shown in Fig. 1, in its central lower part. Fig. 7 is a right end elevation of the construction shown in the preceding figure. Fig. 8 is a diagrammatic representation, by way of alternative construction, of thermostatic means for controlling a water valve. Fig. 9 is a partial vertical section and a partial front elevation of an alternative form of water actuated starting device, with connections, that may be used in place of the device shown in Figs. 1 and 3, the present figure being through the line 9—9 of Fig. 10, looking upward. Fig. 10 is a horizontal section of the structure of the preceding figure, through the line 10—10 of Fig. 9, looking downward. Fig. 11 is a partial plan view and a partial horizontal section of the structure of Fig. 9, through the line 11—11 thereof, looking downward.

First considering the construction of Figs. 1–7: A cup like receptacle 1 leads, through an opening in its under side, into the top of a stand pipe 2, of a capacity sufficient simply to transmit readily the maximum flow of water that may enter the receptacle, as will be explained. The lower end of the pipe 2 leads into a header 3. From the header 3 three pipe coils 4, as shown in Fig. 2, enter the lower right end of a horizontal condenser tank 5, coil forward and back and upward therein, and pass out through the upper left end of the tank into a header 6. A pipe 7 leads downward from the header 6. A liquid ammonia pipe 8 leads from the under side of the right end of the tank 5. A discharge pipe 9 leads upward and thence downward into the top of the left end of the tank 5. A pressure gage 10 is connected with the top of the tank 5. The parts 1 to 10 inclusive and the parts 57, 58, 59, 66, 67 and 68, to be described, constitute one form of condenser including water piping therefor. The system is preferably so charged that the liquid ammonia a little more than half fills the tank 5 during the time that expanded ammonia is being received through the pipe 9. In place of the parts 3 to 6 inclusive, any form of commercial condenser, such as the common atmospheric condenser or the common counter current double pipe condenser, with a liquid refrigerant receiver underneath, may be substituted. These parts are here set forth simply to exhibit means whereby, as will be explained, the cooling water may efficiently take up heat from the liquefied ammonia, rather than, less efficiently, from the gas or vapor coming in from the compressor.

From the outlet end of the pipe 8, an expansion valve 11, preferably of the automatic type, leads into an expansion chamber 12, commonly called an expansion coil. This valve 11, if desired, may be of the kind shown in the patent to me No. 906,508, Dec. 15, 1908, or in the patent to me, upon the application of Carroll and Roehrich, No. 1,137,051, Apr. 27, 1915.

The outlet end of the chamber 12 leads into the suction valve of a compressor 13, driven by an electric motor 14. The compressor 13 discharges its compressed gas into the lower end of the pipe 9 and has a water jacket 15, cooled by water entering the lower part of the jacket from the lower end of the pipe 7. Such water flows to waste through a pipe 16, leading from the upper part of the jacket 15. The compressor 13 preferably is of the well known form of construction having a discharge valve, which a light spring tends to close, as the regular means of discharge, and also a safety head, normally kept closed by a strong spring, that lifts in case of emergency conditions within the compressor, the discharge in either case being into the pipe 9. The parts 13 to 16 inclusive constitute one form of apparatus operative to draw expanded refrigerant from the expansion chamber and to force it into the condenser, and the compressor 13 is one form of forcing means for forcing fluid into the condenser.

From a generator 17 a wire 18 leads through a hand switch 19 to a point 20. As part of a starting rheostat, an arm 21 is pivoted near its left end on an insulated pivot 22 and near its center is pivoted to but is insulated from a core 23, within and magnetizable by a solenoid winding 24. Pivoted to the short and insulated end of the arm 21 is a dash pot device 25, operating to retard the upward movement of the short end when the core 23 is energized. A series of contacts 26 are connected to one another in ascending order by divisional or sub-resistances 27. The highest of the contacts 26 at the upper end of the highest of the resistances 27 connects with the point 20. A wire 28 is connected to the conducting part of the arm 21 near to the pivot 22 and leads to the motor 14. From the motor 14 a wire 29 leads to a point 30 and thence to the generator 17. From the point 20 a branch wire 31 leads to and from a resistance 32 and to and from the winding 24 to a point 33. Strictly speaking, of course, there are three wires—one to the resistance 32, one between the resistance and the winding 24 and one from the winding; but the reference numeral applies to all three. From a contact 34 a wire 35 leads to a contact 36. From a contact 37, near to and in the same horizontal plane as the contact 36, a wire 38 leads to the point 30. The main part of the pipe 2, the condenser tank 5, the motor 14, the compressor 13 and the starting rheostat may be positioned on the under side of flooring 39, as in a basement, and the expansion chamber 12, within a compartment 40, together with the parts 33 and 34 and other parts next to be described, may be above the flooring.

A pipe 41, connected with a source of cold water supply, is controlled by a hand valve 42 and leads into a header 43. Leading downward from the header 43 is a short vertical pipe 44, nearly in axial alinement with the pipe 2 and of a capacity about sufficient to transmit enough cooling water to provide for the minimum requirements of the condenser. Also leading downward from the header 42 is a pipe 45, near to, parallel with and of the same length as the pipe 44, that is controlled by a self closing valve 46. The capacity of the pipe 41 and the combined capacities of the pipes 44 and 45 must be sufficient to transmit enough cooling water to provide for the maximum requirements of the condenser.

Two vertical supports 47, one back of the other, secured by a bracket 48 to a back wall 49, have in their tops knife edge bearings which support the corresponding knife edge ends of the trunnions 50 of a rocking lever 51. The trunnions 50 are to the left of the longitudinal center of the lever 51. The extreme right end of the lever 51 circles around and supports a cup 52, tapering toward its lower end and having at its extreme lower end a nozzle 53 of considerably less capacity than the capacity of the pipe 44. The nozzle 53 may be detachable so that its capacity shall correspond with that of the particular pipe 44 with which it is to be associated. The parts are so positioned that, when the cup 52 is in its extreme elevated position, it is near to the lower ends of the pipes 44 and 45 and the nozzle 53 is substantially in axial alinement with a point midway between the vertical centers of the pipes; and, when the cup is in its extreme depressed position, it is near the upper edge of the receptacle 1 and the nozzle 53 is substantially in axial alinement with the vertical center of the pipe 2. The receptacle 1 is very considerably larger than the cup 52, in order that it may catch all the water overflowing from the cup under the conditions that will be explained. A stout pin 54, projecting frontward from the back wall 49, limits the upward movement of the right end of the lever 51. The left end of the lever 51 is weighted, so that, when the cup 52 is nearly empty, the weighted left end effectually rotates the lever on the trunnions 50 until the right end is stopped by the pin 54; but, when the cup is receiving more water then can pass through the nozzle 53 and hence tends to overflow, the left end of the lever is lifted up. A circuit closer 55 is secured to and is insulated from the upper extreme end of the left end of the lever 51. An insulated flexible wire 56 leads from the point 33 to the non-rotating center of the lever 51 and connects with the circuit closer 55. The construction of the parts is such that, when the cup 52 is in its elevated position, with the lever 51 against the pin 54, there is no connection between the circuit closer 55 and the contact 34; but, when the cup is overflowing and depressed and the left end of the lever 51 is lifted, there is a connection between the circuit closer and the contact and the circuit is closed. The cup 52 constitutes one form of water reservoir draining into the water piping of the condenser and is to be as large as necessary for the purposes to be explained. It is evident that upon an inflow of water into the cup or reservoir 52, in order for the circuit closer 55' to make connection with the contact 34, there must be a sufficient weight of water in the reservoir, rising to a certain level, to overcome the counter-weight at the left end of the lever 51, without the reservoir necessarily being filled; and that, to break such connection, the water in the reservoir needs only to fall to a slightly lower level.

The valve 46, of a kind well known in the art, is kept closed by an internal spring, not shown, except when a pushing force is applied from the outside; and the extent to which the valve is open depends upon how much it is pushed inward. Such a valve is illustrated in the patent issued to me, upon the application of Roehrich, No. 1,172,739, Feb. 22, 1916. But any self closing balanced valve is equally available. From the upper part of the tank 5 a small pressure transmitting pipe 57 leads outward and upward into a lower casing 58, somewhat saucer shaped. A diaphragm 59, preferably of very thin vanadium steel, extends across the top of the casing 58. A head 60 has a flange bearing upon the upper center of the diaphragm 59; it has a transverse opening, in which a slide block 61 may reciprocate slightly to the right or left; and it has a top of reduced diameter. An upper casing 62 is bolted to the casing 58, so as to secure the circumference of the diaphragm 59, and it guides the part of the head 60 above its flange. A bell crank lever 63 has a short shaft with its bearing in the wall of the casing 62; it has, projecting to the right within the casing, a short arm with a more than semi-cylindrical end occupying a corresponding more than semi-cylindrical recess in the block 61; and it has outside the casing a vertical long arm with a push surface at the top adjacent to and adapted to bear upon the valve 46. Within the casing 62 is a helical compression spring 64 bearing at its lower end upon the head 60 and surrounding its top. An adjusting member 65 bears upon the spring 64 and has a section of reduced diameter within the top of the spring; it has a threaded section extending up through a correspondingly threaded opening in the top of the casing 62; and it has on top above the casing a wrench section.

From the upper side of the tank 5 a short pressure transmitting pipe 66 leads upward into a lower casing 67, constructed like the casing 58. Associated with the part 67 are parts 68, 69, 70, 71, 72 and 73 having constructions and functions similar to those of the parts 59, 60, 61, 62, 64, and 65. But the openings in the slide block 70 and the casing 71 are toward the right and instead of a bell crank lever, like the lever 63, there is a horizontal lever 74 with its short arm within the casing 71 and its long arm extending to the right. A bracket 75, secured to a back plate 76, supports the parts 66, 67 and 71 so as to be above and to the rear of the tank 5. A vertical rod 77, carrying at its lower end a circuit closer 78, insulated from the upper part of the rod, is adapted to reciprocate within guide brackets 79 and 80, secured, respectively, to the top and bottom of the plate 76. The circuit closer 78 is adapted to close the circuit between the contacts 36 and 37, as shown; but, if the rod 77 drops down, the circuit is opened. Secured to the rod 77, so as to be a little way above the bracket 80 when the parts 77 and 78 are in the elevated position shown, is a lug 81, projecting to the left and having a squared end. Above the lug 81 the rod 76 is threaded and carries a sleeved nut 82 and a lock nut 83. A quite light helical compression spring 84 abuts against the nut 82 and surrounds its sleeve. A sleeved ring 85 rather loosely surrounds the rod 76 above the spring 84 and has its sleeve within the top of the spring. The outer end of the lever 74 is forked and has its forks bearing upon the upper surface of the ring 85 and adapted to slide freely for a short distance along the rod 76. It will be observed that the springs 72 and 84 coöperate in tending to rotate slightly the lever 74 counter-clockwise; but that such tendency may be overcome by pressure exerted on the under side of the diaphragm 68. An L-shaped bracket 86 projects frontward from the plate 76 and has its L part projecting still farther toward the front. A bell crank lever 87 is pivoted on the bracket 86; it has one arm extending downward with a catch at its lower end adapted to engage and hold the lug 81, as shown; and it has, projecting to the right, a forked arm, with the forks outside of the spring 84 and just under the ring 85. A light flat spring 88 is screwed to the L part of the bracket 86 and bears upon the lower arm of the lever 87 so as to tend slightly to rotate it counter-clockwise.

The method of operation is as follows: The switch 19 may remain closed during the season of operation. By means of the member 65 the spring 64 may be so adjusted that the valve 46 will begin to open at some such pressure, indicated by the gage 10, as 150 pounds, for ammonia, corresponding to a temperature of 84 degrees in the condenser, and will be fully open at a pressure of 180 pounds, corresponding to a temperature of 95 degrees. It will be noted that however much the valve 46 may be open, in consequence of high atmospheric temperature outside the condenser, there will be no flow of water so long as the valve 42 is closed. Hence, as will appear, there can be no waste of water while the compressor 13 is standing idle. Let it be assumed that the refrigerating system is to be run during the day time and is to be shut down overnight, the compartment 40 being kept cold during the night by the usual brine tank.

In the morning the valve 42 is opened. Thereupon water flows through the header 43 and the pipe 44 into the cup 52. Some of this water runs through the nozzle 53. But, as the nozzle 53 has a capacity less than that of the pipe 44, the cup 52 soon fills up and overflows. The weight of water rising in the cup 52 quickly lifts up the left end of the lever 51 so that the circuit breaker 55 makes connection with the contact 34. Thereupon a current passes from the point 20 through the parts 31, 32, 24, 33, 56, 55, 34, 35, 36, 78, 37, 38, 30 and 29 back to the generator 17. The energization of the core 23 lifts the right end of the arm 21 so as to cut out successively the resistances 26 until the full current is passing from the point 20 through the parts 21 and 28 to the motor 14 and thence through the part 29 back to the generator 17. The compressor 13 now running at full speed, draws expanded ammonia from the chamber 12 and forces it, by way of the pipe 9, into the condenser.

When the compressor 13 is thus started, it is immaterial whether the atmospheric temperature outside of the condenser is such as to cause the valve 46 to be open or closed. Suppose, under the assumed adjustment, such outside temperature is below 84 degrees, so that the valve 46 is closed. Then water flowing from the nozzle 53 and water overflowing from the cup 52 fall into the receptacle 1, pass through the stand pipe 2, the header 3, the coils 4, the header 6, the pipe 7, the jacket 15 and the pipe 16 to waste. In cool weather such a supply would be sufficient to cool the heated ammonia in the tank 5 and the compressor 13. But in summer weather the pressure, as indicated by the gage 16, tends to rise above 150 pounds. In such case the pressure of vapor in the pipe 57 and the casing 58 bears upon the diaphragm 59 so as to tend to force the head 60 and the block 61 upward in opposition to the spring 64. The lever 63 thereupon is rotated slightly counter-clockwise so as to open the valve 46. Thereupon water from the pipe 45 adds itself to the water overflowing the cup 52 and increases the supply in the condenser. This increase tends to diminish the heat in the condenser. An equilibrium is thus established. In other words there is an automatic regulation of the supply of cooling water according to the requirements of the refrigerating system, such supply being controlled by pressure conditions in the condenser. If the pipe 45 had been made to add to the supply of condensing water by discharging directly into the receptacle 1 or elsewhere rather than into the cup 52, the supply through the pipe 44 might be so drawn upon that the right end of the lever would tend to rise and so break the connection with the contact 34. But by the construction set forth not merely does the closing effect upon the lever 51 remain undiminished, but also such effect is increased. Now suppose the temperature outside the condenser at starting is over 84 degrees and that the valve 46 is consequently open. Then, when the valve 42 is opened, water flows into the cup 52 through the pipes 44 and 45 with the same starting effect as before.

Suppose during the active period of operation there is a diversion of the water entering the pipe 41, such as may happen when the street mains are drawn upon in case of fire or of a flushing of the street or even when other outlets are opened in the building itself. The flow of water into the cup 52 then ceases and what water there is in the cup drains off through the nozzle 53. With a drop of the water level in the cup 52, but before the water drains away, the weighted left end of the lever 51 breaks the connection between the circuit breaker 55 and the contact 34; the current through the winding 24 ceases; the arm 21 drops down; and the motor 14 and the compressor 13 begin to slow down and finally stop. If the outside temperature is not above 95 degrees, as the condenser cools down, the pressure on the under side of the diaphragm 59 tends to drop and the spring 64 bears upon the head 60 so as to rotate the lever 63 clockwise, thus permitting the valve 46 to close. There is precisely the same sequence of events, when, at the end of the day, the valve 42 is closed by hand. But there is this subsequent difference. When the valve 42 is closed, the compressor does not run again until the valve is again opened. On the other hand, when there is a cessation of the water supply entering the pipe 41, with the consequent automatic stopping of the compressor, when the supply comes on again, the compressor automatically starts up in the manner that has been described. While the motor 14 and the compressor 13 are coming to rest, in the interval after the circuit closer 55 has broken connection with the contact 34 in consequence of a cessation of the inflow of condensing water arising from either of the causes stated, the compressor, under the momentum of the moving parts, is still discharging hot gas into the condenser. If, under such circumstances, the flow of water through the condenser water piping had been simultaneously shut off, the tendency would have been not merely to create a head pressure high enough to open the circuit closer 78, in the manner to be described, but also to produce a dangerous pressure in the system. But this tendency, in my construction, is counter-acted by the provision of the reservoir, which continues to supply water to the condenser water piping in the interval between the time when the current is shut off to the motor 14 and the time when it and the compressor 13 come to rest. It is also to be noted that whenever a flow of water is admitted to the reservoir, water begins to flow into the condenser water piping before the compressor 13 fairly gets under way, thus making certain some cooling of the condenser even before it can receive any hot gas.

Such is what may be called the normal operation of the refrigerating system. But it sometimes happens that, even with this construction, there may be an abnormal pressure in the system. Such a condition may arise from several causes, such as the passage into or through the pipe 41 becoming clogged, or the coils 4 becoming foul, or the pipe 41 being originally of too small diameter, or the condenser being too small for the compressor, or the accumulation of non-condensable gases in the condenser. In any such case the compressor should be stopped and, after the ascertainment of the cause, the condition should be rectified. A careful owner of the plant, by observing the gage 10, may discover an excessive pressure and act accordingly. But in case such a condition remains undetected, the compressor should be stopped absolutely in case the condenser pressure rises to 220 pounds.

The nuts 82 and 83 are simply for adjusting and maintaining the thrust of the spring 84. The pressure at which the circuit closer 78 shall break connection with the contacts 36 and 37 is determined by the thrust of the spring 72 as fixed by the adjustment of the member 73. Suppose the adjustment is made for action at a pressure of 220 pounds. When such a pressure is reached, the pressure of the vapor in the pipe 66 and the casing 67 forces the diaphragm 68 and the head 69 upward in opposition to the spring 72, so as to rotate the lever 74 clockwise. The lever 74 then forces the ring 85 downward so as still more to compress the spring 84 and especially, by means of the ring, does it rotate the lever 87 clockwise in opposition to the spring 88 until the lower arm springs clear of the lug 81. It will be observed that here is a trigger action, the device being a quick motion device or trigger. Thereupon the thrust of the spring 84 upon the nut 82 quickly forces the rod 77 downward so that the circuit closer 78 breaks connection with the contacts 36 and 37. Thereupon, as in the case of the cessation of the water supply, the current through the winding 24 ceases; the arm 21 drops down; and the motor 14 and the compressor 13 stop. But here there is no mere suspension of operation. With a drop of pressure on the under side of the diaphragm 68, the spring 72 forces the head 69 downward and rotates the lever 74 counter-clockwise. But the lower arm of the lever 87, actuated by the spring 88, has been locked, upon the descent of the rod 77, above the lug 81. So that nothing further happens automatically. When, however, it is again desired to restore the machine to the control of the water actuated starting device, the lever 87 is rotated clockwise by hand in opposition to the spring 88 and the rod 76 is pushed up until the lower arm of the lever again locks under the lug 81 and the circuit closer 78 again connects the contacts 36 and 37. The parts 66 to 88 inclusive therefore constitute an emergency safety device.

The advantages of my emergency safety device construction, with a breaking of a light current in parallel with the motor 14 as the emergency means for stopping the compressor 13, is that, on the one hand, the flash that would result from a breaking of the heavy current through the motor is avoided, and, on the other hand, there is a certainty of action that would not be possible if the means were dependent upon the closing of a short circuiting device.

It is evident that the principle of my invention is not limited to a compression machine, but that it broadly applies to any apparatus operative to draw an expanded refrigerant of any kind from an expansion chamber and to force it into a condenser and that it includes means for controlling the supply of energy, of whatever kind that may be employed to operate such apparatus, by the flow of condensing water, also of means for graduating such flow according to the requirements of the system and also of means for shutting off such supply of energy in case of abnormal pressure in the system. It is also evident that the principle of my invention applies to any fluid circulating system that employs a compressor to force the compressed air or gas into a condenser. It is to be noted that, while the pipes 57 and 66 are so connected that the quantity of water flowing from the header 43 and the action of the emergency device, narrowly speaking, are controlled by the condenser pressure, yet, more broadly speaking, in each case, such control is effectuated by the head pressure of the apparatus.

Under recent practice, enforced by municipal regulations, many refrigerating machines are equipped with automatic safety valves that discharge from the high pressure side into the low pressure side, or through a diffuser, into the atmosphere, when a predetermined dangerous pressure is reached, the limit for ammonia being 300 pounds. But with my construction, supplemented by a safety head for a compression machine, the operation of the machine can develop no such pressure in any part of the system.

Next considering the construction of Fig. 8: A pipe 89, connected with a source of cold water supply, has a horizontal section and leading downward therefrom a vertical section, which latter section is to be understood as leading to a header such as the header 43. All parts in operative connection with the pipe 89, other than those about to be described, are to be understood to be the same as those already described, with the exception only of the parts 41 and 42, which are superseded by the present construction. A valve 90 controls the flow of water through the horizontal section of the pipe 89 and has an actuating arm 91 extending below the horizontal section and pivoted at its lower end to a double end solenoid core 92. From a contact 93 a wire 94 leads to and from a solenoid winding 95 that surrounds the left end of the core 92. From a contact 96 a wire 97 leads to and from a solenoid winding 98 that surrounds the right end of the core 92. When the winding 95 is energized, it moves the core 92 to the left so that the valve 91 is in a closed position, as shown, and the left end of the core forces a spring circuit closer 99 to the left and away from the contact 93, as shown, the circuit closer having by reason of its spring construction a tendency to return to the position of contact. But when the winding 98 is energized, it moves the core 92 to the right so that the valve 91 is in an open position and the right end of the core 92 forces a spring circuit closer 100 away from a closed position, as shown, into a position away from the contact 96, this circuit closer also having by reason of its spring construction a tendency to return to the position of contact. The weight of the parts 90, 91 and 92 is such and the friction of so much thereof as is in sliding contact with the parts 89, 95 and 98 is such that, after the winding 95 has been energized, the first mentioned parts stay in the position shown notwithstanding a slight tendency of the circuit closer 99 to push the core 92 to the right, and that, after the winding 98 has been energized, the first mentioned parts stay in the position to the right where the circuit closer 100 is away from the contact 96 notwithstanding a slight tendency of the circuit closer 100 to push the core 92 to the left. From an adjustable high temperature contact 101 a wire 102 leads to the fixed end of the circuit closer 100. From an adjustable low temperature contact 103 a wire 104 leads to the fixed end of the circuit closer 99. A thermostatic blade 105 is pivoted at its upper end at 106, is adapted to transmit current from a wire 107, at a high temperature limit makes contact at its free end with the contact 101 and at a low temperature limit makes contact at its free end with the contact 103. It is to be understood that the wire 107 leads from and the wires 94 and 97 lead to a source of electric energy. The wires 107 and 94 and 97 may be connected with a battery B, as has been usual with similar constructions. If preferred the wire 107 may be so connected as to lead from the wire 31, say at a point between the resistance 32 and the winding 24, with or without an additional resistance; and in case of such a connection, the wires 94 and 97 may lead to the point 30.

The method of operation of the alternative construction of Fig. 8 is as follows: As the temperature about the blade 105 rises, the blade approaches the contact 101 and at the high temperature limit it makes contact therewith. Thereupon a current passes from the blade 105 through the parts 101, 102, 100, 96 and 97 so as to energize the winding 98. The energization of the winding 98 moves the core 92 to the right so as to open the valve 90, by means of the arm 91, and also opens the circuit closer 100. The opening of the valve 90 has the same effect as has been described in reference to opening the valve 42. As the temperature about the blade 105 begins to fall, the blade draws away from the contact 101, but without any sparking, the connections between the circuit closer 100 and the contact 96 being broken. With a further fall of temperature about the blade 105, the blade approaches the contact 103 and at the low temperature limit it makes a contact therewith. Thereupon a current passes from the blade 105 through the parts 103, 104, 99, 93 and 94 so as to energize the winding 95. The energization of the winding 95 moves the core 92 to the left so as to close the valve 90, by means of the arm 91, and also opens the circuit closer 99. The closing of the valve 90 has the same effect as has been described in reference to closing the valve 42. As the temperature about the blade 105 begins to rise, the blade draws away from the contact 103 with the same absence of sparking as in case of the contact 101.

Inasmuch as the movements of a blade controlled by slight changes of temperature, such as the blade 105, from contacts, such as the contacts 101 and 103, are necessarily slow, under the usual construction there are prolonged contact connections which tend to wear away the blade and the contacts. But with my construction, in consequence of the instantaneous breaking of the circuit as soon as contacts have been made no such wearing away can occur. This construction may be used not merely with the construction of the preceding figures but also with the construction of the succeeding figures.

Finally considering the construction of Figs. 9-11: A reservoir casing 108 has within its vertical center a chamber 109 that for most of its length is cylindrical in shape, with a number of grooves 110, say six, in the side wall of the chamber. The lower part of the chamber 109, below its cylindrical part, is somewhat of the shape of an inverted bell. Through a wall of the casing 108, from the lowest part of the chamber 109, there leads a small vertical passage 111. At the lower end of the cylindrical part of the chamber 109, two stop lugs 112 project from a wall of the casing 108 inwardly toward the vertical center of the chamber. The upper part of the casing 108 is widely flanged and beyond the extreme right of the flange it has a short vertical cylindrical pipe section 113. From the top of the section 113 a large passage 114 leads along outside of the flanged part of the casing 108 and outside of the wall of the cylindrical part of the chamber 109 and enters from the right the bell shaped part of the chamber. The flanged upper part of the casing 108 has a considerable space into which the chamber 109 and the grooves 110 are free to discharge. Leading downward from the flanged part of the casing 108 a passage 115, a little larger than the passage 114, is parallel with the cylindrical part of the chamber 109 for the upper part of its length, then curves around and under the bell shaped part of the chamber, so as to receive the outflow from the passage 111, and then terminates in a short vertical section passing through the lower end of the casing. From the lower end of the passage 115, a pipe 116 leads, as it is to be understood, to the header 3, or to whatever form of condenser may be provided. A hollow piston float 117, conical at the top, occupies practically all of cylindrical part of the chamber 109 and tends to seat itself, as shown, on the lugs 112. A flexible diaphragm 118, which may be of rubber, extends over the flanged top of the casing 108 and is held in place at the circumference by a ring 119 and nuts 120. A bracket 121 extends from front to back over the diaphragm 118 along a line a little to the right of the axial center of the chamber 109; it is bolted at its front and rear ends to the ring 119; it is elevated between its ends a little distance above the diaphragm 118; and it has on top, midway from front to back, two supports 122. A pivot 123 passes through the supports 122 and through the right end of a lever 124, positioned between the supports. A rod 125 passes through and is secured to the center of the diaphragm 118; it is secured to the conical top of the float 117; it is forked on top, the forks being in front of and back of the lever 124; and it has a lateral slot in each fork. A pin 126 passes through the slots of the forks of the rod 125 and through the intermediate lever 124. The left end of the lever 124 extends beyond the left edge of the casing 108 and carries at its extreme end the circuit breaker 55, the contact 34, and the wire 35 being in the same relation thereto as in Fig. 1.

From the pivot 33, as before, the wire 56 leads to the non-rotating center of the lever 124, and thence to the circuit breaker 55. The parts 41, 42, 43, 44, 45 and 46 are constructed and have the same functions as in Fig. 1; but the pipes 44 and 45 lead into the top of the section 113 through a plate 127 bolted to the top of the section. The push face of the lever 63 is here shown, as it is in practice, very near to the axial center of the upper arm of the lever, and not at a considerable distance therefrom as in Fig. 1. The capacity of the passage 114 and of the grooves 110, plus the free annular space outside of the float 117 is sufficient readily to transmit the maximum flow of water received from the pipes 44 and 45. But the capacity of the passage 111 is considerably less than the capacity of the pipe 44.

The method of operation of the construction of Figs. 9-11, in connection with that part of the structure of Figs. 1-7 that remains unaltered, is as follows: It is to be understood that the casing 108 is positioned a little above the tank 5 and the jacket 15. When the valve 42 is opened, water flows through the header 43, the pipe 44, the plate 127 and the passage 114 into the chamber 109. Some of this water runs through the passage 111. But, as the passage 111 has a capacity less than that of the pipe 44, the space in the chamber 109 outside of the float 117 and in the grooves 110 soon fills up and the water therein overflows through the passage 115. The water thus entering and overflowing quickly lifts the float 117 and thereby lifts the rod 125, the center of the diaphragm 118 and the lever 124 so that the circuit breaker 55 makes connection with the contact 34 as before and the same train of events in starting the compressor 13 happens as before. The water flowing from the passages 111 and 115 flows through the pipe 116 to the condenser as before. A flow of water through the valve 46 takes place under the same circumstances as before and this water passes through the pipe 45, the plate 127, and the passage 114 into the chamber 109. The impulse of this additional water acting on the float 117 adds to the closing effect of the lever 124. When the flow of water through the passage 114 ceases, either through the closing of the valve 42 or otherwise as has been stated, the water in the chamber 109 begins to drain away through the passage 111, the float 117 falls and seats itself on the lugs 112 and the parts 125, 118 and 124 drop so that the circuit closer 55 breaks connection with the contact 34 as before. In this construction the casing 108 constitutes a reservoir, corresponding to the cup 52, that, with the same safety effect as before, continues to supply water to the condenser water piping in the interval between the time when the current is shut off from the motor 14, in consequence of a breaking of connection between the circuit closer 55 and the contact 34, and the time when the compressor 13 comes to rest. And in this construction, it is evident that, upon an inflow of water into the casing 108, the water, upon rising to a certain level, lifts the float 117, so as to cause the circuit closer 55 to make connection with the contact 34, irrespective of whether the reservoir is or is not filled; and that, to break such connection, the water needs only to fall to a slightly lower level, for the float to fall, and before the reservoir drains away. The other details of operation will be readily understood from what has previously been said.

In this last construction the necessity of the stand pipe 2 is obviated and there is no possibility of an overflow, such as might arise with the receptacle 1 if the condenser water piping should become clogged. The casing 108 may be placed at any convenient place in the water supply piping, provided that it is a little above the tank 5 and the jacket 15, so as to permit a draining away of the residual water.

It is to be noted that an inflow of water into the reservoir, whether upon an opening of the valve 42 or the valve 90 or upon a resumption of the supply, is normally the sole means for causing a starting of the forcing means; and that a cessation of the flow, whether from a closing of the valve or from a cessation of the supply, in the absence of an abnormal pressure so excessive as to actuate the emergency device, is the sole means for causing a shutting off of the power that operates the forcing means. In other words, the starting and stopping mechanism is not a mere safety device. Therefore the actuation of any special or additional switch to close or to open the circuit to the motor 14 is rendered unnecessary. And especially is it true that my construction secures a greater certainty of action. For if the non-flow of condensing water were utilized to actuate a safety device to shut off the power only in case of a failure of the water supply, the device might act so seldom as to get out of order without its condition being detected. By using the inflow and the non-flow of condensing water as the sole means for normally starting and stopping the forcing means it is necessary to provide, as has been done in my construction, a passage always open for the escape of water from the reservoir. It is also to be noted, in my construction, by a division of operative effects, that the failure of the water supply, which is the ordinary cause of excessive pressure and which usually occurs suddenly, acts at once to stop the forcing means; that a resumption of the supply again starts the forcing means; and that the emergency device acts only when the maximum flow of condensing water has failed to prevent a very abnormal pressure, caused by some such infrequent condition as foul condenser piping, or the presence of non-condensable gases, or a too small condenser, or an ill designed condenser, in all of which latter conditions the rise of pressure is almost always gradual. Consequently, before the emergency device acts in any one of these extreme cases, there is a chance to discover and remedy the condition.

While the mere automatic disconnecting of the conductors in series with the winding 24 in case of a cessation of the flow of condensing water, and also in case of an excessive condenser pressure, would afford a fair degree of safety, I regard the maximum of safety to be attained by also causing, as shown, the starting of the operation of the apparatus for forcing fluid into the condenser to be absolutely dependent upon the availability of a flow of condensing water. It is to be noted that the elements having these functions can be used independently of the mechanism for graduating the flow of condensing water. That is to say the valve 46 and the means for its control have the function merely of preventing an uneconomically excessive flow of condensing water and, if desired, they may be omitted, so that, without diminution, the maximum flow of water may pass from the pipe 41 and the valves 42 or 90, as the case may be, without lessening the safety effect of the other elements of the controlling mechanism. It is to be understood that the valve 42 is merely a diagrammatic representation of any kind of causative means for permitting a flow of cooling water to the condenser. It is also to be understood that the starting rheostat shown is a diagrammatic representation of various types of starting devices, commonly termed self starters, that tend so to position themselves that no current can pass through the conductors of the motor circuit but that respond to a branch current through a magnet winding thereof, so long as such branch current continues, so as first to permit a current in the motor circuit through a series of resistances, then to cut out the resistances successively and finally to permit of a full current in the motor circuit. I am, however, not to be understood as being limited to any particular form of construction for producing the operative effects disclosed.

What I have invented and what I desire to have protected by Letters Patent is expressed in claims as follows:

I claim:

1. In combination, a condenser including water piping, a reservoir discharging downward into the piping, a regulator for varying the flow through the reservoir and the piping, energy operated forcing means for forcing fluid into the condenser, and means controlled by the head pressure to act upon the regulator to vary such flow according to the variations of such pressure.

2. In combination, a condenser including water piping, a reservoir discharging downward into the piping, a regulator for varying the flow through the reservoir and the piping, energy operated forcing means for forcing fluid into the condenser, means controlled by conditions in the reservoir to permit a starting and to cause a stopping of the forcing means, and means controlled by the head pressure to act upon the regulator to vary such flow according to the variations of such pressure.

3. In combination, a condenser including water piping, a reservoir discharging downward into the piping, a regulator for varying the flow through the reservoir and the piping, energy operated forcing means for forcing fluid into the condenser, and means controlled by the head pressure to act upon the regulator to vary such flow according to the variations of such pressure and in case of an excessive pressure interrupting such operation.

4. In combination, a condenser including water piping, a reservoir discharging downward into the piping, a regulator for varying the flow through the reservoir and the piping, energy operated forcing means for forcing fluid into the condenser, means controlled by conditions in the reservoir normally to permit a starting and to cause a stopping of the forcing means, and means controlled by the head pressure to act upon the regulator to vary such flow according to the variations of such pressure and in case of an excessive pressure interrupting such operation.

5. In combination, a condenser including water piping, a reservoir discharging downward into the piping, a regulator for varying the flow through the reservoir and the piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means for so connecting the conductors, means breaking such connection upon a fall of the liquid level in the reservoir, and means controlled by the head pressure to act upon the regulator to vary such flow according to the variations of such pressure.

6. In combination, a condenser including water piping, a reservoir discharging downward into the piping, a regulator for varying the flow through the reservoir and the piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means for so connecting the conductors, means breaking such connection upon a fall of the liquid level in the reservoir, and means controlled by the head pressure to act upon the regulator to vary such flow according to the variations of such pressure and in case of an excessive rise of pressure to disconnect the conductors.

7. In combination, a condenser including water piping, a reservoir discharging downward into the piping, a regulator for varying the flow through the reservoir and the piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means so connecting the conductors upon a rise of liquid in the reservoir and disconnecting them upon a fall of the liquid level therein, and means controlled by the head pressure to act upon the regulator to vary such flow according to the variations of such pressure.

8. In combination, a condenser including water piping, a reservoir discharging downward into the piping, a regulator for varying the flow through the reservoir and the piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means normally so connecting the conductors upon a rise of liquid in the reservoir and disconnecting them upon a fall of the liquid level therein, and means controlled by the head pressure to act upon the regulator to vary such flow according to the variations of such pressure and in case of an excessive rise of pressure to disconnect the conductors.

9. In combination, a condenser including water piping, a regulator for varying the flow through the piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means for so connecting the conductors, means breaking such connection upon a cessation of the flow of liquid in the piping, and means controlled by the head pressure to act upon the regulator to vary such flow according to the variations of such pressure.

10. In combination, a condenser including water piping, a regulator for varying the flow through the piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means connecting the conductors upon an inflow of liquid in the piping and disconnecting them upon a cessation of the flow therein, and means controlled by the head pressure to act upon the regulator to vary such flow according to the variations of such pressure.

11. In combination, a condenser including water piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means for so connecting the conductors, and means breaking such connection upon a cessation of the flow of liquid in the piping.

12. In combination, a condenser including water piping, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, and means connecting the conductors upon an inflow of liquid in the piping and disconnecting them upon a cessation of the flow therein.

13. In combination, a condenser, electrically operated forcing means for forcing fluid into the condenser, a circuit closer device operating during the passage of a current through a magnet winding thereof to close the circuit of the forcing means but tending to open the circuit, conductors adapted for connection to permit the passage of such current, means for connecting the conductors under normal conditions of head pressure, and means operating in case of an excessive head pressure to disconnect the conductors.

14. In combination, a condenser including water piping, a regulator for permitting a constant minimum of flow through the piping and for varying the flow above such minimum up to a maximum, energy operated forcing means for forcing fluid into the condenser, and means controlled by the head pressure to act upon the regulator to decrease such flow toward the minimum as the pressure falls and to increase the flow toward the maximum as the pressure rises.

15. In combination, a condenser including water piping, a reservoir discharging into the piping, energy operated forcing means for forcing fluid into the condenser, and throttling means controlling the flow through the reservoir and the piping, permitting a constant minimum flow therethrough and controlled by the head pressure to vary such flow between such minimum limit and a maximum according to the variations of such pressure.

16. In combination, a condenser including water supply piping therefor, a reservoir discharging downward into said piping, a compressor leading into the condenser, power operated driving means for driving the compressor, and means shutting off the power from the driving means upon a cessation of the inflow of liquid into the reservoir.

17. In combination, a condenser including water supply piping therefor, a reservoir discharging downward into said piping, a compressor leading into the condenser, power operated driving means for driving the compressor, and means shutting off the power from the driving means upon a fall of the liquid level in the reservoir.

18. In combination, a condenser including water supply piping therefor, a reservoir discharging downward into said piping, a compressor leading into the condenser, power operated driving means for driving the compressor, and means turning on the power to the driving means upon an inflow of liquid into the reservoir and shutting off such power upon a cessation of such inflow.

19. In combination, a condenser including water supply piping therefor, a reservoir discharging downward into said piping, a compressor leading into the condenser, power operated driving means for driving the compressor, and means turning on the power to the driving means upon a rise of liquid in the reservoir and shutting off such power upon a fall of the liquid level therein.

20. In combination, a condenser including water supply piping therefor, a reservoir discharging downward into said piping, a compressor leading into the condenser, power operated driving means for driving the compressor, and means shutting off the power from the driving means upon a cessation of the inflow of liquid into the reservoir and while the flow in the piping continues.

21. In combination, a condenser including water supply piping therefor, a reservoir discharging downward into said piping, a compressor leading into the condenser, power operated driving means for driving the compressor, and means shutting off the power from the driving means upon a cessation of the inflow of liquid into the reservoir but before a draining thereof.

22. In combination, a condenser including water supply piping therefor, a reservoir discharging downward into said piping, a float in the reservoir, a compressor leading into the condenser, power operated driving means for driving the compressor, and means shutting off the power from the driving means upon a fall of the float.

23. In combination, a condenser including water supply piping therefor, a reservoir discharging downward into said piping, a float in the reservoir, a compressor leading into the condenser, power operated driving means for driving the compressor, and means turning on the power to the driving means upon a rise of the float and shutting off such power upon a fall of the float.

24. In combination, a condenser, energy operated forcing means for forcing fluid into the condenser, means for permitting the transmission of operative energy to the forcing means, means for permitting a constant flow of water to the condenser, means increasing such flow as the condenser pressure rises, and means suspending such transmission upon a cessation of the flow.

25. In combination, a condenser, energy operated forcing means for forcing fluid into the condenser, means for permitting the transmission of operative energy to the forcing means, means for permitting a constant flow of water to the condenser, means increasing such flow as the condenser pressure rises and decreasing the flow to the former volume as the pressure falls, and means suspending such transmission upon a cessation of the flow.

26. In combination, a condenser, energy operated forcing means for forcing fluid into the condenser, means for permitting a constant flow of water to the condenser, means increasing such flow as the condenser pressure rises, and means actuated by such flow to permit the transmission of operative energy to the forcing means and suspending such transmission upon a cessation of the flow.

27. In combination, a condenser, energy operated forcing means for forcing fluid into the condenser, means for permitting a constant flow of water to the condenser, means increasing such flow as the condenser pressure rises and decreasing the flow to the former volume as the pressure falls, and means actuated by such flow to permit the transmission of operative energy to the forcing means and suspending such transmission upon a cessation of the flow.

28. In combination, means for transmitting operative energy, a device when actuated by a supply of liquid permitting the transmission of operative energy by said means, a regulator permitting a minimum flow past the device and adapted to permit an increase of such flow up to a maximum, and a controller acting upon the regulator to graduate such flow between such limits according to the variations of pressure exerted upon the controller.

29. In a fluid circulating system, a condenser, electrically operated forcing means for forcing fluid into the condenser, a magnetizable device adapted to close the circuit of the forcing means but tending to open the circuit, a magnet winding operating during the energization thereof to close said circuit but upon a cessation of such energization permitting the device to open the circuit, conductors adapted to be connected in series with the winding, means for so connecting the conductors, and means disconnecting the conductors in case of an excessive head pressure.

30. In a fluid circulating system, a condenser having a water conduit, electrically operated forcing means for forcing fluid into the condenser, a magnetizable device adapted to close the circuit of the forcing means but tending to open the circuit, a magnet winding operating during the energization thereof to cause the device to close said circuit but upon a cessation of such energization permitting the device to open the circuit, conductors adapted to be connected in series with the winding, means for so connecting the conductors, means for permitting a flow of water through the conduit, and means disconnecting the conductors in case the head pressure rises to a limit beyond the control of such flow.

31. In a fluid circulating system, a condenser, electrically operated forcing means for forcing fluid into the condenser, electric conductors adapted to be connected in series with the forcing means, a magnetizable device adapted so to connect the conductors but tending to disconnect them, a magnet winding operating during the energization thereof to cause the device to act according to its adaptability but upon a cessation of such energization permitting the device to act according to its tendency, branch conductors adapted to be connected in series with the winding, means for so connecting the branch conductors, and means disconnecting the branch conductors in case of an excessive head pressure.

32. In a fluid circulating system, a condenser having a water conduit, electrically operated forcing means for forcing fluid into the condenser, electric conductors adapted to be connected in series with the forcing means, a magnetizable device adapted so to connect the conductors but tending to disconnect them, a magnet winding operating during the energization thereof to cause the device to act according to its adaptability but upon a cessation of such energization permitting the device to act according to its tendency, branch conductors adapted to be connected in series with the winding, means for so connecting the branch conductors, means for permitting a flow of water through the conduit, and means disconnecting the branch conductors in case the head pressure rises to a limit beyond the control of such flow.

33. In a fluid circulating system, a condenser having a water conduit, electrically operated forcing means for forcing fluid into the condenser, electric conductors adapted to be connected in series with the forcing means, a magnetizable device adapted so to connect the conductors but tending to disconnect them, a magnet winding operating during the energization thereof to cause the device to act according to its adaptability but upon a cessation of such energization permitting the device to act according to its tendency, branch conductors adapted to be connected in series with the winding, means actuated by a flow of water in the conduit so to connect the branch conductors, and means disconnecting the branch conductors in case of an excessive head pressure.

34. In a fluid circulating system, a condenser having a water conduit, electrically operated forcing means for forcing fluid into the condenser, electric conductors adapted to be connected in series with the forcing means, a magnetizable device adapted so to connect the conductors but tending to disconnect them, a magnet winding operating during the energization thereof to cause the device to act according to its adaptability but upon a cessation of such energization permitting the device to act according to its tendency, branch conductors adapted to be connected in series with the winding, means actuated by a flow of water in the conduit so to connect the branch conductors, and means disconnecting the branch conductors in case the head pressure rises to a limit beyond the control of such flow.

35. In a fluid circulating system, a condenser, a compressor leading into the condenser, an electric motor for driving the compressor, electric conductors adapted to be connected in series with the motor, a series of resistances connected at one end thereof with one of the conductors, a magnetizable device adapted to make connection between the other conductor and the unconnected end of the resistances, to cut out the resistances successively and finally to make connection between the conductors but tending to break such connections, a magnet winding operating during the energization thereof to cause the device to act according to its adaptability but upon a cessation of such energization permitting the device to act according to its tendency, branch conductors adapted to be connected in series with the winding, means for so connecting the branch conductors, and means disconnecting the branch conductors in case of an excessive head pressure.

36. In combination, a condenser including water piping, a reservoir discharging downward into the piping, energy operated forcing means for forcing fluid into the condenser, and means interrupting the transmission of operative energy to the forcing means upon a fall of the liquid level in the reservoir and also in case of an excessive head pressure.

37. In combination, a condenser including water piping, a reservoir discharging downward into the piping, energy operated forcing means for forcing fluid into the condenser, and means interrupting the transmission of operative energy to the forcing means upon a cessation of the inflow of liquid into the reservoir and also in case of an excessive head pressure.

38. In combination, a condenser including water piping, a reservoir discharging downward into the piping, energy operated forcing means for forcing fluid into the condenser, and means interrupting the transmission of operative energy to the forcing means upon a cessation of the inflow of liquid into the reservoir but before a draining thereof and also in case of an excessive head pressure.

39. In combination, a condenser including water piping, a reservoir discharging downward into the piping, energy operated forcing means for forcing fluid into the condenser, a float in the reservoir, and means interrupting the transmission of operative energy to the forcing means upon a fall of the float and also in case of an excessive head pressure.

40. In a refrigerating system including an expansion chamber and a condenser, an apparatus operative to draw expanded refrigerant from the expansion chamber and to force it into the condenser, means for turning on a flow of cooling water to the system, means actuated by such flow to operate the apparatus, and means automatically varying such flow to maintain a predetermined head pressure.

41. In a refrigerating system including an expansion chamber and a condenser, an apparatus operative to draw expanded refrigerant from the expansion chamber and to force it into the condenser, means for controlling a flow of cooling water to the system, means actuated by such flow to start the operation of the apparatus and normally to continue its operation during the continuance of the flow, and means varying such flow according to the requirements of the system.

42. In a refrigerating system including an expansion chamber and a condenser, an apparatus operative to draw expanded refrigerant from the expansion chamber and to force it into the condenser, means for turning on a flow of cooling water to the system, means actuated by such flow to start the operation of the apparatus and normally to continue its operation during the continuance of the flow, means automatically varying such flow to maintain a predetermined head pressure, and means stopping the apparatus in case such head pressure is exceeded by an excessive margin.

43. In a refrigerating system including an expansion chamber and a condenser, an apparatus operative to draw expanded refrigerant from the expansion chamber and to force it into the condenser, means for turning on a flow of cooling water to the system, means actuated by such flow to start and to keep in operation the apparatus, and means varying such flow according to the requirements of the system and leaving undiminished such actuating effect.

44. In a refrigerating system including an expansion chamber and a condenser, an apparatus operative to draw expanded refrigerant from the expansion chamber and to force it into the condenser, means for turning on a flow of cooling water to the system, means actuated by the force of such flow to start and to keep in operation the apparatus, and means tending as the head pressure tends to rise to increase such flow and force.

45. In a refrigerating system including an expansion chamber and a condenser, an apparatus operative to draw expanded refrigerant from the expansion chamber and to force it into the condenser, energizing means for operating the apparatus, a water motor operative to start and to continue the action of the energizing means, means for turning on a flow of cooling water to operate the motor and to supply the system, means controlled by conditions in the high pressure side of the system to vary such flow for maintaining a predetermined head pressure, and means stopping the apparatus in case such head pressure is exceeded by an excessive margin.

46. In a refrigerating system including an expansion chamber and a condenser, an apparatus operative to draw expanded refrigerant from the expansion chamber and to force it into the condenser, energizing means for operating the apparatus, and a water motor having a drain passage, permitting an overflow to the condenser of water received in excess of the capacity of the drain passage, operating upon receiving a flow of water in excess of the capacity of the drain passage to start and to continue the action of the energizing means and suspending such action upon a suspension of such flow.

47. In a refrigerating system including an expansion chamber and a condenser, an apparatus operative to draw expanded refrigerant from the expansion chamber and to force it into the condenser, a casing having a chamber, a drain passage leading from the lower part of the chamber, an overflow passage leading from the upper part of the chamber and an inlet passage into the chamber of a capacity in excess of the capacity of the drain passage, a float in the chamber, means for controlling a flow of cooling water into the inlet passage in excess of the capacity of the drain passage and to supply the system with water flowing away from the casing, means actuated by a rise of the float to start the operation of the apparatus and by a fall thereof to stop such operation, means controlled by the pressure in the high pressure side of the system to vary the flow of cooling water to the system for maintaining a predetermined head pressure, and means stopping the apparatus in case such head pressure is exceeded by an excessive margin.

48. In a refrigerating system including an expansion chamber and a condenser, an apparatus operative to draw expanded refrigerant from the expansion chamber and to force it into the condenser, means for operating the apparatus, and means permitting a graduated flow of cooling water to the system to maintain a predetermined head pressure exclusively in the time of the operation of the apparatus.

49. In a refrigerating system including a compressor, a condenser leading therefrom and an expansion chamber leading from the condenser into the compressor, an electric motor for driving the compressor, conductors when connected in series adapted to transmit current to the motor, a device adapted to connect the conductors in series but tending to disconnect them, a magnet winding operating when energized to overcome the tendency of the device and thereby to cause such connection, branch conductors potentially in series with the winding, means controlled by the temperature produced by the expansion of refrigerant in the expansion chamber normally to close the circuit of the branch conductors at a high temperature limit and to open it at a low temperature limit, and means operating upon a predetermined rise of pressure in the condenser to break the circuit of the branch conductors irrespective of the action of the former means.

50. In a refrigerating system including a compressor, a condenser leading therefrom and an expansion chamber leading from the condenser into the compressor, an electric motor for driving the compressor, a high temperature contact, a low temperature contact, a thermostatic member controlled by the temperature produced by the expansion of refrigerant in the expansion chamber, at a high temperature limit making connection with the high contact and at a low temperature limit making connection with the low contact, means closing a first circuit at the making of such connection with the high contact and starting the motor, means closing a second circuit at the making of such connection with the low contact and stopping the motor, and means breaking the first circuit upon such starting and the second circuit upon such stopping.

51. In a refrigerating system including a compressor, a condenser leading therefrom and an expansion chamber leading from the condenser into the compressor, an electric motor for driving the compressor, a high contact, a low contact, a thermostatic member controlled by the temperature produced by the expansion of refrigerant in the expansion chamber, at a high temperature limit making connection with the high contact and at a low temperature limit making connection with the low contact, a pipe for supplying cooling water to the system, a valve controlling the pipe, means operating upon the opening of the valve to start the motor and upon the closing of the valve to stop the motor, a double end solenoid core connected with the valve, a first winding adapted to energize one end of the core so as to open the valve, a second winding adapted to energize the other end of the core so as to close the valve, means closing a circuit through the first winding when the member makes such connection with the high contact, and means closing a circuit through the second winding when the member makes such connection with the low contact, said core upon being moved by the energization of the first winding breaking the circuit therethrough and upon being moved by the energization of the second winding breaking the circuit therethrough.

52. In combination, a condenser, water supply piping therefor, electrically operated forcing means for forcing fluid into the condenser, an expansion chamber leading from the condenser into the forcing means, a thermostat controlled by the temperature of the expansion chamber, a magnetizable device adapted to close the circuit of the forcing means but tending to open the circuit, a magnet winding during the energization thereof operating upon the device to close said circuit but upon a cessation of such energization permitting the device to open the circuit, conductors adapted to be connected in series with the winding, and means controlled by the thermostat and by the flow and the cessation of the flow of liquid in the piping to connect and to disconnect the conductors.

53. In combination, a condenser, water supply piping therefor, electrically operated forcing means for forcing fluid into the condenser, an expansion chamber leading from the condenser into the forcing means, a thermostat controlled by the temperature of the expansion chamber, a magnetizable device adapted to close the circuit of the forcing means but tending to open the circuit, a magnet winding operating during the energization thereof to cause the device to close said circuit but upon a cessation of such energization permitting the device to open the circuit, conductors adapted to be connected in series with the winding, and means operating at a high temperature limit of the thermostat and in case of a flow of liquid in the piping to connect the conductors and to disconnect them either at a low temperature limit of the thermostat or in case of a cessation of such flow.

54. In combination, a condenser, water supply piping therefor, electrically operated forcing means for forcing fluid into the condenser, an expansion chamber leading from the condenser into the forcing means, a thermostat controlled by the temperature of the expansion chamber, a magnetizable device adapted to close the circuit of the forcing means but tending to open the circuit, a magnet winding operating during the energization thereof to cause the device to close said circuit but upon a cessation of such energization permitting the device to open the circuit, conductors adapted to be connected in series with the winding, and means controlled by the thermostat and the flow of liquid in the piping under normal conditions of head pressure to connect the conductors and by the thermostat, by the cessation of such flow and by an excessive head pressure to disconnect them.

55. In combination, a condenser, water supply piping therefor, electrically operated forcing means for forcing fluid into the condenser, an expansion chamber leading from the condenser into the forcing means, a thermostat controlled by the temperature of the expansion chamber, a magnetizable device adapted to close the circuit of the forcing means but tending to open the circuit, a magnet winding operating during the energization thereof to cause the device to close said circuit but upon a cessation of such energization permitting the device to open the circuit, conductors adapted to be connected in series with the winding, and means operating at a high temperature limit of the thermostat and in case of a flow of liquid in the piping under normal conditions of head pressure to connect the conductors and to disconnect them either at a low temperature limit of the thermostat, or in case of a cessation of such flow, or in case of an excessive head pressure.

56. In combination, a condenser including water piping, energy operated forcing means for forcing fluid into the condenser, a water reservoir draining into the piping and supplying the piping while the reservoir is filling, and means preventing the starting of the forcing means prior to a rise of liquid in the reservoir.

57. In combination, a condenser including water piping, energy operated forcing means for forcing fluid into the condenser, a water reservoir draining into the piping and supplying the piping while the reservoir is filling, means preventing the starting of the forcing means prior to a rise of liquid in the reservoir, and means shutting off the energy for the operation of the forcing means upon a cessation of the inflow into the reservoir.

58. In a fluid circulating system, a condenser including water piping, forcing means for forcing fluid into the condenser, means whereby under normal conditions of head pressure a supply of liquid in the piping permits the operation of the forcing means, means controlled by the head pressure to graduate the flow of liquid in the piping to maintain such pressure within normal limits, and means interrupting the operation of the forcing means either upon a cessation of such flow or in case of an excessive rise of such pressure.

59. In a refrigerating system, a condenser including water piping, an expansion chamber leading from the condenser, a thermostat affected by the temperature of the chamber, forcing means for drawing expanded refrigerant from the chamber and forcing it into the condenser, means under normal conditions of head pressure and with a supply of liquid in the piping operative at a high temperature limit of the thermostat to start the operation of the forcing means, means controlled by the head pressure to graduate the flow of liquid in the piping to maintain such pressure within normal limits, and means interrupting the operation of the forcing means either at a low temperature limit of the thermostat or upon a cessation of such flow or in case of an excessive rise of head pressure.

60. In combination, a condenser including water piping, energy operated forcing means for forcing fluid into the condenser, and means controlled by the flow and the non-flow of liquid in the piping and by the head pressure to permit recurrent startings and to cause recurrent stoppings of the forcing means and in case of an excessive head pressure to cause a stopping thereof.

61. In combination, a condenser including water piping, forcing means for forcing fluid into the condenser, and means controlled by the flow and the non-flow of water in the piping and by the head pressure to permit a starting and to cause a stopping of the forcing means and to graduate the flow in the piping.

62. In combination, a condenser including water piping, energy operated forcing means for forcing fluid into the condenser, emergency means controlled by the head pressure for interrupting the operation of the forcing means in case such pressure becomes excessive, and means interrupting the operation of the forcing means upon a cessation of the flow of liquid in the piping and before a rise of the head pressure sufficient to cause the emergency means to operate and permitting a resumption of the operation of the forcing means upon a resumption of such flow.

GEORGE P. CARROLL.

Witnesses:
ARTHUR A. JOHNSON,
MILLARD FILLMORE.